United States Patent
De Campos Bartolomeu et al.

(10) Patent No.: US 9,313,043 B2
(45) Date of Patent: Apr. 12, 2016

(54) METHOD AND APPARATUS FOR THE DETERMINISTIC CAPTURE OF A COMMUNICATION CHANNEL SHARED AMONG CONTENTION BASED TECHNOLOGIES

(75) Inventors: Paulo Jorge De Campos Bartolomeu, Maia (PT); Jose Alberto Gouveia Fonseca, Aveiro (PT)

(73) Assignees: UNIVERSIDADE DE AVERIO, Aveiro (PT); MICRO I/O SERVICOS DE ELECTRONICA, LDA., Aveiro (PT)

( * ) Notice: Subject to any disclaimer, the term of this patent is extended or adjusted under 35 U.S.C. 154(b) by 713 days.

(21) Appl. No.: 13/515,231

(22) PCT Filed: Jul. 13, 2010

(86) PCT No.: PCT/IB2010/053202
§ 371 (c)(1),
(2), (4) Date: Oct. 4, 2012

(87) PCT Pub. No.: WO2011/070449
PCT Pub. Date: Jun. 16, 2011

(65) Prior Publication Data
US 2013/0016735 A1    Jan. 17, 2013

(30) Foreign Application Priority Data
Dec. 10, 2009   (PT) ........................................ 104868

(51) Int. Cl.
*H04L 12/413* (2006.01)
*H04W 74/08* (2009.01)
(52) U.S. Cl.
CPC ......... *H04L 12/413* (2013.01); *H04W 74/0808* (2013.01)

(58) Field of Classification Search
CPC .................... H04L 12/413; H04W 74/0808
USPC ................... 370/338, 458, 465, 508
See application file for complete search history.

(56) References Cited

U.S. PATENT DOCUMENTS 5,721,738 A * 2/1998 Kubota et al. ............... 370/508
6,014,087 A   1/2000 Krishnakumar et al.
(Continued)

OTHER PUBLICATIONS

Joao L. Sobrinho, and A. S. Krishnakumar, "Quality-of-Service in Ad Hoc Carrier Sense Multiple Access Wireless Networks", Aug. 1999, IEEE Journal on Selected Areas in Communications, vol. 17, No. 8, pp. 1353-1368.*

(Continued)

*Primary Examiner* — Andrew Lai
*Assistant Examiner* — Chuong M Nguyen
(74) *Attorney, Agent, or Firm* — Merchant & Gould P.C.

(57) ABSTRACT

Communications with timeliness guarantees, also known as real-time communications are established in a shared medium with different contention based technologies. A real-time station is able to transmit a noise sequence before the intended data packet transmission. The noise sequence being is to occupy the communication medium during a period of time preferably larger than the maximum transmission time of any contention based technology that can have access to the medium, hereinafter designated alien. As such, even if an alien station is transmitting, it will finish its packet during the transmission of the noise sequence. The method prevents the alien stations from accessing the medium as these stations will sense the medium busy after the end of their packet transmissions. This method can be used to support master-multislave real-time communications on shared media in which contention based technologies operate.

11 Claims, 5 Drawing Sheets

(56) References Cited

U.S. PATENT DOCUMENTS

| | | | |
|---|---|---|---|
| 6,172,984 B1 | 1/2001 | Beyda et al. | |
| 7,039,063 B2* | 5/2006 | Krishnakumar et al. | 370/444 |
| 7,397,785 B2* | 7/2008 | Wu et al. | 370/350 |
| 7,813,414 B2* | 10/2010 | Lewis | 375/219 |
| 2001/0024434 A1* | 9/2001 | Ayyagari et al. | 370/347 |
| 2005/0129036 A1 | 6/2005 | Sawabe | |
| 2006/0146869 A1* | 7/2006 | Zhang et al. | 370/465 |
| 2008/0112375 A1* | 5/2008 | Bennett | 370/338 |

OTHER PUBLICATIONS

International Search Report for International Application No. PCT/IB2010/053202 mailed Feb. 23, 2011.

Bartheomeu et al. "Enforcing Flexibility in Real-Time Wireless Communications: A *Bandjacking* Enabled Protocol." *IEEE* . 2009. pp. 1-4.

Sobrinho et al., "EQuB-Ethernet quality of service using black bursts." *Proceedings 23$^{rd}$ Annual. Conc. Erence*. 1998. pp. 286-296.

\* cited by examiner

METHOD AND APPARATUS FOR THE DETERMINISTIC CAPTURE OF A COMMUNICATION CHANNEL SHARED AMONG CONTENTION BASED TECHNOLOGIES

This application is a National Stage Application of PCT/IB2010/053202, filed 13 Jul. 2010, which claims benefit of Serial No. 104868, filed 10 Dec. 2009 in Portugal and which applications are incorporated herein by reference. To the extent appropriate, a claim of priority is made to each of the above disclosed applications.

TECHNICAL DOMAIN OF THE INVENTION

This invention refers to a method and device that are able to deterministically guarantee the access and capture of a communication medium in which a frequency band is shared among different contention-based medium access technologies.

SUMMARY OF THE INVENTION

The aim of this invention is to solve the problem of deterministically capturing, within a time interval, a communications medium in which a frequency band is shared among different contention-based medium access technologies, namely in communication scenarios where timeliness guarantees must be provided, i.e. real-time communications.

The present invention describes a method to capture a shared transmission medium (11) by a real-time station (1) using a noise sequence (30) followed by a data packet transmission (31).

A preferred embodiment of the present invention consists in using a noise synthezizer (3) to generate a noise sequence (30) that can be initiated in any instant, even if the communication medium (11) is occupied with transmissions from alien stations.

A more preferred embodiment of the present invention consists in transmitting the noise sequence (30) with a transmission power greater than or equal to the maximum transmission power of any alien technology that can be competing for the medium.

An even more preferred embodiment of the present invention consists in using a noise sequence (30) whose duration is larger than the largest packet duration of any alien technology that can compete for the medium, or by any means guaranteeing that the noise sequence (30) transmission always finishes after the end of any on-going transmission from an alien station.

Still another preferred embodiment of the present invention consists in transmitting the noise sequence (30) in a frequency band including the data band (21), leading to the evaluation of the medium as being busy by competing alien communication technologies (21).

Still another preferred embodiment of the present invention consists in transmitting the first data packet (31), using a commercial transceiver (4), after the end of the noise sequence (30), within a temporal window smaller than the minimum idle channel assessment time of any alien technology being considered.

Still another preferred embodiment of the present invention employs a secondary and simultaneous noise transmission (32) in the adjacent bands, lower interference sub-band (20) and higher interference sub-band (22), whenever there are alien communication technologies operating over the data band (21) but using larger bandwidths.

Still another preferred embodiment of the present invention enables real-time data transmissions initiated by a Master Station (1), which transmits a noise sequence (30), in the interference band (23), followed by a data packet (31), in the data band (21), containing information that triggers the transmission of real-time data packets (61) from slave stations (2), in the data band (21), in a protected window (40) hindering transmissions from alien communication technologies.

A more preferred embodiment of the present invention consists in the transmission of the trigger packet (31) by a Master Station (1), immediately after the end of the noise sequence (30), defining the time bounds of the elementary cycle (43) and the packet scheduling for transmissions in the protected window (40).

An even more preferred embodiment of the present invention consists in the transmission of real-time packets (61) issued by slave stations (2), in the protected window (40), in the instants defined by the trigger message (31), occupying the medium for disjoint periods of time, separated by a minimum time equal or higher than the Inter Frame Space (IFS) of the real-time communication technology.

Another preferred embodiment of the present invention consists in the transmission of secondary and simultaneous noise (32) in the adjacent bands, in the lower interference sub-band (20) and in the higher interference sub-band (22). A further preferred embodiment of the present invention consists in maintaining the capture of the communication medium (11), during the protected time window (40) between the trigger packet (31) and the first data packet transmission (61) issued by a Slave Station (2) and also between consecutive data packet transmissions (61) from these stations, through the transmission of noise sequences (60) in the interference band (23), hindering alien stations from detecting the medium idle in these periods and initiate transmissions that would corrupt the protected window (40).

Still a preferred embodiment of the present invention consists in the transmission of a secondary noise sequence (32), in the lower (20) and higher (22) interference sub-bands, which prevents the alien stations from detecting the medium idle and, in consequence, from initiating a transmission that would interfere with the contention window (41).

A more preferred embodiment of the present invention consists in a device (1) that able to capture and maintain control over a communication medium shared with alien technologies, including a conventional sub-station (2), preferably built using a commercial transceiver (4) and a communications controller (5), and a configurable noise synthesizer (3), preferably built using an FPGA, Field Programmable Gate Array (6), two digital-to-analog converters (7), and two radio-frequency front-ends (8).

A still more preferred embodiment of the present invention defines that the device (1) has the preferential feature of being able to transmit noise sequences (30, 60, 62) using the noise synthesiser (3) and data packages (31) through the commercial transceiver (4), according to the method described in any of the claims from 1 to 13.

An additional preferred embodiment of the present invention consists in a noise synthesiser (3) that generates bandwidth noise profiles with configurable bandwidth, duration, central frequency and power by modifying the production rate of digital DSSS signals and duration, namely in a FPGA (6), upconversion frequency and gain, namely in the radio-frequency front-end (8), allowing to emulate the spectral occupation of the communication technologies that operate in the 2.4 GHz ISM band such as IEEE 802.11, IEEE 802.15.1 or IEEE 802.15.4.

The suggested invention presents several innovations with regards to the techniques currently available, namely:

- the real-time station transmissions can begin at any moment and not just after the medium is available for a certain period of time;
- it addresses the existence of alien technologies that compete for the same communication medium;
- it defines a noise sequence with fixed duration that aims to make all the neighbour stations (alien and conventional) enter in backoff state so that the subsequent (and immediate) transmission of a data packet will not be affected by them;
- the proposed technique can be applied in the implementation of protocols based in the master-multislave communication model;
- in which only the master station employs non-standard hardware;
- Slave stations can be implemented with low-cost (standard) transceivers, simply requiring to be kept active to receive the trigger packet and during the protected and contention windows; they can, therefore, turn of the transceivers in the remaining period so as to maximize their autonomy;
- the invention allows interrupting potential transmissions from alien stations that are not within the area of influence of the standard communication technology used by the master station for data transmissions, but within the range of the technology used to generate the noise;
- The network resynchronization is conducted at each elementary cycle, which allows diminishing the impact of clock drifts in the quality of synchronization, reducing the guard delays where the medium is kept available and allowing the implementation of the stations using controllers with low processing resources.

BACKGROUND OF THE INVENTION

The U.S. Pat. No. 7,039,063 "Priority Access for Real-Time Traffic in Contention-Based Networks", refers to a priority access mechanism for stations that need real-time communications, maintaining the possibility of connecting to standard stations. It addresses contention-based networks and claims the usage of a noise sequence (termed black burst) whose duration establishes the priority in the arbitration of the medium access between real-time stations.

This patent applies only to wired communication media, particularly Ethernet, where real-time stations instantly detect the occurrence of collisions. The usage of noise sequences seeks to establish a prioritization of real-time stations with regards to standard stations. At the same time, the use of noise sequences with different durations allows controlling the medium access arbitration among real-time stations.

The patent defines the catenation process of real-time packets transmitted by distinct stations that access the medium in a sequential manner without following the standard guard times for Ethernet. This packet concatenation process guarantees collision avoidance between real-time packets and, since it maintains the medium occupied, it prevents standard stations from initiating transmissions between the real-time packets of the chain.

Nevertheless, given the support of multiple transmission chains (real-time), the occurrence of transmissions from standard stations (between chains) can result in a significant medium access delay for the subsequent chain(s). Such might have a significant impact in real-time transmission delay of subsequent chains. This delay and its variation can became inadequate for a large set of applications such as, for example, the closed loop control (industrial processes, artificial breathing, etc.).

U.S. Pat. No. 6,014,087, "Variable Contention Transmission Media Access Based on Idle Waiting Time", from the same inventors, establishes an access mechanism for real-time data transmission (video) in IEEE 802.11 wireless networks. The inventors claim a medium access mechanism similar to the one specified in U.S. Pat. No. 7,039,063 without including the notion of transmission concatenation and having the IEEE 802.11 standard as the target technology.

None of the presented solutions, nor its conjunction, allows establishing real-time communications in media where multiple technologies compete for the respective access. This limitation is due to 4 distinct factors:

a) the documents address the existence of communications in a medium and in a spectrum band of a sole technology (for example Ethernet or IEEE 802.11);
b) define black bursts (noise sequences) that are intended to interfere solely with communications of a single technology;
c) do not guarantee medium access timeliness of real-time stations in the presence of other technologies that operate in the same medium over the same frequency band;
d) the solutions presented can not be implemented using commercial transceivers given that they depend on the ability to evaluate the medium without initiating a transmission (a feature inexistent in commercial transceivers).

GENERAL DESCRIPTION OF THE INVENTION

The invention herein described aims to support communications with timeliness guarantees (limited delay and jitter), commonly known as real-time communications, in a medium where a frequency band is shared by several contention-based technologies.

The proposed transmission method uses a real-time station that integrates a noise synthesiser device and a standard communication device, commercially available. The transmission of a real-time data package is preceded by the injection of a noise sequence of a fixed duration that occupies (and corrupts) the communication medium during a period of time corresponding to the maximum transmission time of a packet from any contention-based technology that exists in the neighbourhood, hereinafter referred to as alien.

After this period is complete, the required transmission of data is initiated. Thus, even if alien transmissions are ongoing at the beginning of the noise sequence, these will be concluded during its course, making the subsequent (alien) transmission, if it exists, to find the medium occupied and postpone its transmission to a future instant.

In this scenario, given that the (real-time) data packet is transmitted immediately after the noise sequence, alien transmission attempts in its course will be prevented since the medium will be occupied. Furthermore, the probability of an alien station to begin a transmission in the time window separating the end of the noise sequence and the beginning of the data transmission is very low, guaranteeing, this way, the desired timeliness for the data transmission.

Next, using several illustrations, a detailed description of the medium access technique and the device that supports it is provided. This description is supported in several details marked in the illustrations with numbers and referred to in the text between parentheses in bold. For example, the scenario that will be used to describe the present invent is marked as (10) in FIG. 1. In this scenario, several communication technologies share a frequency band of a given medium (11) for the exchange of information.

DESCRIPTION OF THE DRAWINGS

For an easier understanding of the invention, several Figures are apended, which represent preferred embodiments of the invention not aiming however to deviating from the scope of the present invention.

FIG. 6: Schematic representation of a set of signals illustrating the organization of the transmissions in an elementary cycle, wherein:

(60) represents the overhead compensation noise transmitted in the interference band (23) between the end of the trigger packet (31) and the first real-time packet of a slave station (61),
(61) represents the transmission of a slave station real-time packet in the data band (23), and
(62) represents the transmission of occupation noise, in the interference band (23), between the real-time packet transmissions of slave stations, with a duration equal to the Inter Frame Space (IFS) of the data technology.

DETAILED DESCRIPTION OF THE INVENTION

In order to illustrate the operation of the invention, without deviating from generality, a wireless communication medium shared by four devices is assumed:
   2 conventional stations CS2 and CS3 that operate using IEEE 802.15.4 technology,
   1 real-time station RTS1 that includes:
      1 Conventional substation CS1 (IEEE 802.15.4)
      1 Programmable Noise Synthesizer PNS1,
   1 Alien Station AS1 that employs IEEE 802.11 technology.

Figure 1:
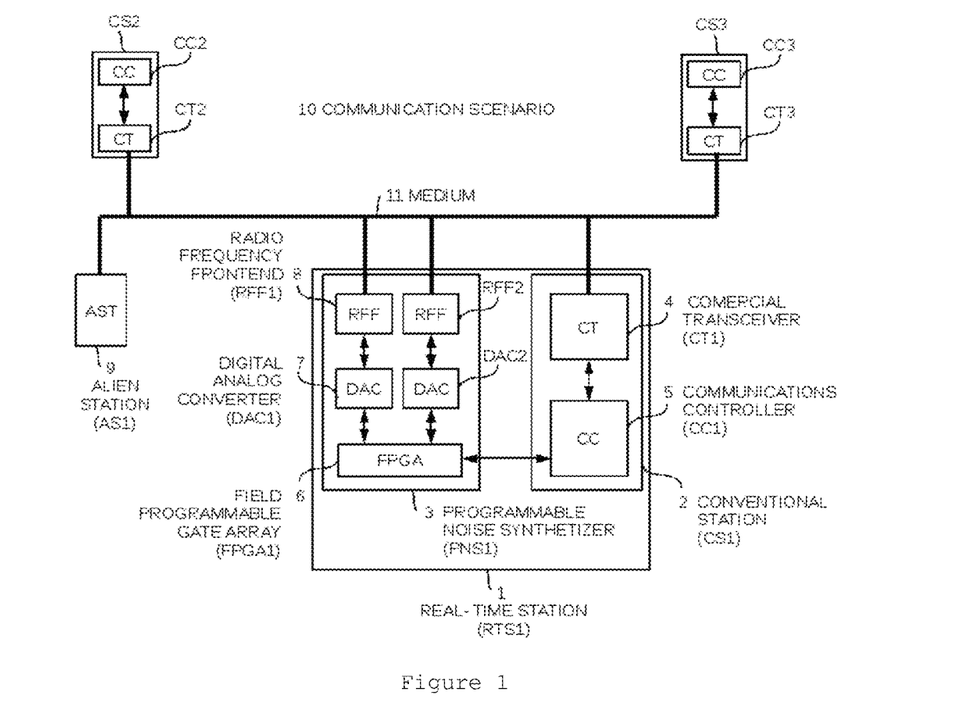
FIG. 1: Schematic representation of a network in which a medium of communication is shared between contention-based technologies wherein:
(1) represents a Real-Time Station (RTS),
(2) Represents a Conventional Station (CS),
(3) Represents a Programmable Noise Synthesizer (PNS),
(4) Represents a Commercial Transceiver (CT),
(5) Represents a Communication Controller (CC),
(6) Represents a Field Programmable Gate Array (FPGA),
(7) Represents a Digital-Analog Converter (DAC),
(8) Represents a Radio Frequency Fronted (RFF),
(9) Represents an Alien Station (AS),
(10) Represents the communication scenario in which the invention is illustratively embodied, and
(11) represents the shared communication medium

Despite the option of describing the invention according to scenario (10) in FIG. 1, a usage environment may encompass a larger number of stations and/or communication technologies.

Figure 2:
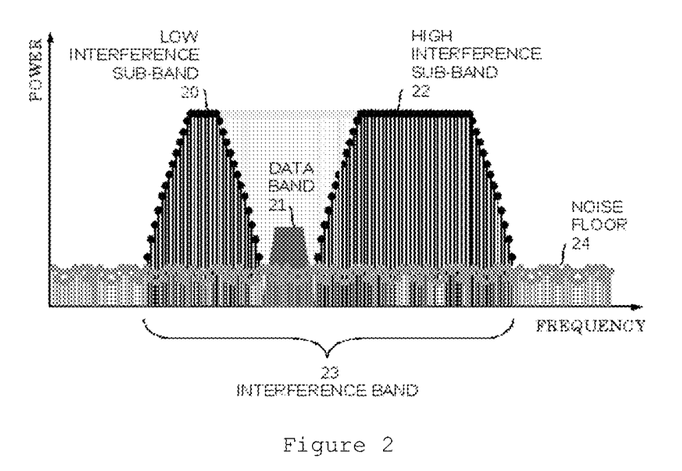
FIG. 2: Schematic Representation of the spectrum in which the invention and the alien technologies operate, wherein:
(20) represents the interference low sub-band,
(21) represents the data communication band,
(22) represents the interference high sub-band, and
(23) represents the interference band.

As depicted in FIG. 2, conventional stations CS1, CS2 and CS3 transmit in the data band corresponding, for example, to the channel 17 of the IEEE 802.15.4 technology (21), and are able to access the medium in three distinct ways:
   1) Operating in the beaconless mode with conventional contention,
   2) Operating in the beaconless mode with contention in which the backoff slot range, preceding a Clear Channel Assessment (CCA), is limited through configuration,
   3) Without contention, accessing instantly to the channel.

The first two access modes use the Carrier Sense Multiple Access with Collision Avoidance (CSMA/CA) provided in the specification of the IEEE 802.15.4 technology, whereas the third mode is solely available in the transceivers of some manufacturers (for example, Microchip). Station AS1 operates in the interference band, for example, channel 6 of the IEEE 802.11 technology (23), and accesses the medium using the Distributed Coordination Function (DCF), which employs the CSMA/CA algorithm defined in the IEEE 802.11 specification.

The synthesiser PNS1 produces noise profiles according to FIG. 2, generating interference with a spectral content equivalent to alien interference (23) or noise in the two sub-bands (20) and (22). The noise synthesiser transmissions PNS1 are carried out without contention. The requirement of performing noise transmissions in the two identified sub-bands is related with the alien technologies receiver sensibilities with regards to the data technology being used. Next, an example of this requirement is presented.

The conventional station CS2 operates in medium (11) and in data band (21) while the alien station AS1 operates in the same medium, but in the interference band (23). Assuming that station CS2 employs the aforementioned technique Carrier Sense Multiple Access with Collision Avoidance (CSMA/CA) and that it is ready to transmit at instant $t_a$, it immediately starts counting from a random number of backoff slots before evaluating the state of the medium (Clear Channel Assessment) in an instant $t_b$ ($t_b > t_a$).

Assuming that the medium is free at that instant, station CS2 starts the transmission of a data packet until instant $t_d$ ($t_d > t_b$). However, it is possible that, at instant $t_c$ ($t_b < t_c < t_d$), an alien station, for example AS1, is ready to transmit a packet and starts the evaluation of the medium for a period equal to the DCF Inter Frame Space (DIES), declaring it free at instant $t_{c'}$ ($t_c < t_{c'} < t_d$). In that case, AS1 will initiate a transmission that will corrupt the ongoing transmission of the CS2 station (from instant $t_{c'}$ until instant $t_d$). This can occur because wireless short-range communication technologies (for example, IEEE 802.15.4) have a reduced impact, in terms of interference, in moderate-range wireless communications (for example, IEEE 802.11), i.e., the level of energy produced by a transmission is not sufficient for the alien technologies to declare the medium as occupied. Therefore, ongoing transmissions of conventional stations can be affected by transmissions of alien technologies. To cope with scenarios where alien technologies perform transmissions with higher power and larger bandwidths than the employed data technology, and to avoid the interruption of (conventional) data transmissions, a noise transmission in the adjacent bands (low (20) and high (22) sub-bands) of the data band must be transmitted simultaneously with required power level to hinder alien stations from detecting the medium as idle.

The legal limit to the transmission of noise in the 2.4 GHz ISM band corresponds to 100 mW (20 dBm) of Effective Isotropic Irradiated Power (EIRP) in the European space (standard ETSI EN 300 328) or 1 W (30 dBm) of Peak Conducted Output Power in the United States of America (regulation FCC part 15.247 and 15.249), considering, in both cases, the generation of noise with Direct Sequence Spread Spectrum (DSSS) signals. Therefore, either the noise produced in the interference band (23) or in the sub-bands (20) and (22) must use DSSS signals with power limited to 100 mW (20 dBm) EIRP.

In application scenarios where the data communication technology has a larger bandwidth and a higher transmission power than the potential alien technologies, there is no requirement of performing simultaneous noise transmissions. Such occurs because ongoing data transmissions will be perceptible by alien stations and, therefore, will not be interrupted.

In scenarios in which alien technologies are characterized by a) a higher transmission power, but having a narrower bandwidth, only the power of data transmission can be increased; b) a lower power, but having a larger bandwidth, data transmission can be accompanied by noise in adjacent bands, emulating transmissions of the alien technology.

The presented approach merely protects data transmissions that are ongoing at the beginning of an alien transmission, i.e., it only guarantees the channel intrusion avoidance after its capture. Since this invention aims to enable the medium access and capture in a deterministic manner, a technique allowing the capture of the medium regardless of its occupation state is required.

Figure 3:
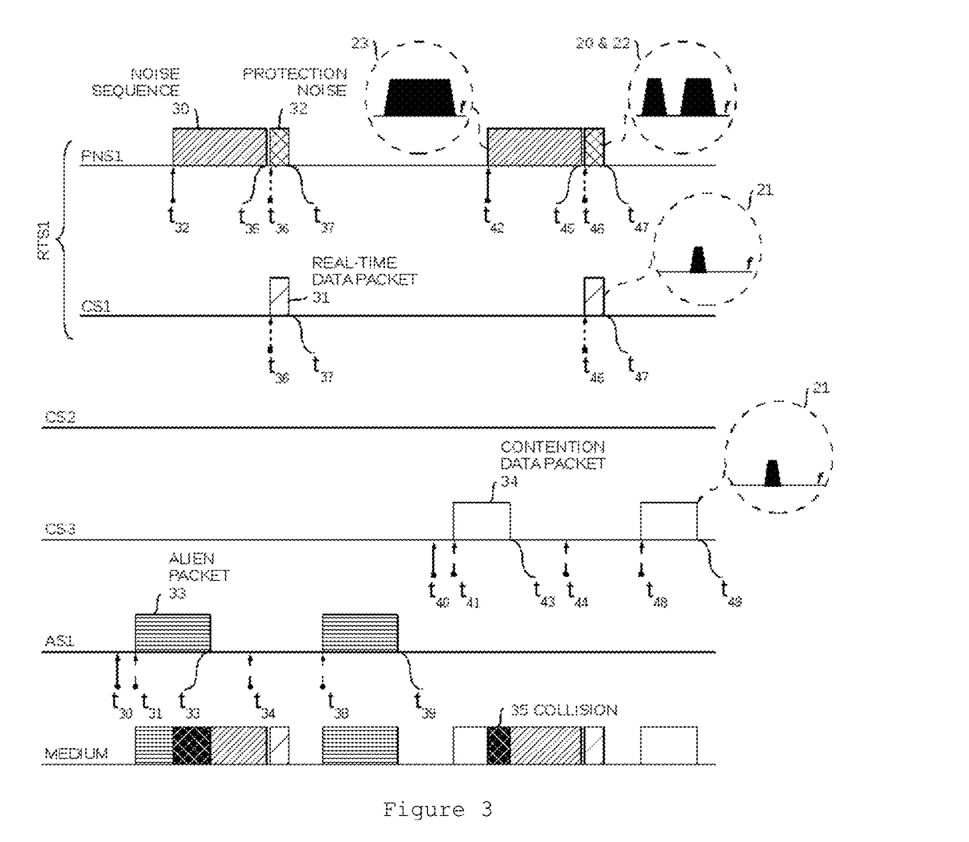
FIG. 3: Schematic representation of a set of signals illustrating the capture method of a shared communication medium, wherein:
(30) represents the transmission of a noise sequence in the interference band (23),
(31) represents the transmission of a real-time data packet in the data band (21),
(32) represents the transmission of protection noise in the low (20) and in the high (22) interference sub-bands,
(33) represents the transmission of an alien data packet in the interference band (23),
(34) represents the transmission of a data packet with contention in the data band (21),
(35) represents the occurrence of a collision.

FIG. 3 depicts a sequence of signals allowing the description of the capture technique embodied by this invention. The presented technique has two phases:
1) Transmission of a noise sequence (30) with a fixed duration in the noise band (23);
2) Transmission of a data packet (31) with timeliness requirements (real-time) in the data band (21) and, simultaneously, transmission of a protection noise sequence (32) in the sub-bands (20) and (22).

The transmission of the noise sequence (30) has the goal of interrupting any alien communications that may be ongoing in the medium (11) and in the data band (21), releasing it for the transmission of real-time data packets (31).

The duration of this transmission must be preferably equal or higher than the duration of the longest packet transmitted by any potential alien technology. This method guarantees that, even if the noise sequence starts at the same time as the alien transmission, it will extend beyond its conclusion. Therefore, at the end of the noise sequence (30), the medium will be free since all the transmissions that were previously initiated will be concluded and alien stations that attempted medium access in the meanwhile found it busy, thus postponing their transmissions to a later time. So that a noise sequence (30) prevents a given alien technology from using the data channel (band), it is necessary that it occupies a band of frequencies equal or larger than the alien technology, employing a noise profile with equivalent levels of energy (or higher, up to the legal limit of, for example, 100 mW EIRP in the 2.4 GHz ISM band).

Another important aspect is the requirement that the noise sequence (30) is not interpreted by conventional stations as a data transmission. This requirement arises from the fact that when a conventional station detects the beginning of a packet in the medium, it waits for its conclusion, and then proceeds for the decoding process. In most cases, the time spent in this activity prevents conventional stations from starting a data transmission immediately after the noise sequence.

The preferential architecture of a real-time station RTS (1) that is able to conduct data transmissions based on the IEEE 802.15.4 technology and immune to interference from IEEE 802.11 stations is illustrated in FIG. 1. This station integrates a conventional station CS (2) and a programmable noise synthesiser PNS (3). The former, besides two radio-frequency front-ends RFF (8), also employs two digital-analogue converters DAC (7) and a Field Programmable Gate Array FPGA (6), which enables the generation of noise sequences with configurable duration, bandwidth, central frequency and power.

The simultaneous noise synthesization in the low (20) and high (22) interference sub-bands are implemented using the FPGA (6) to generate two different DSSS digital signals (with potentially different bandwidths) which, after being converted into analogue signals in the DAC (7), are object of individual upconversion and amplification in the RFF (8) before being propagated in the medium (11) using an omnidirectional antenna. The FPGA produces digital DSSS noise signals with the bandwidth defined by the communication controller CC (5), for example, 11 Mbps when the target alien technology is the IEEE 802.11b standard. Afterwards, this signal is converted to analogue and shifted in the frequency by performing a multiplication procedure with the signal of an oscillator with configurable frequency (controlled by the FPGA), for example, the central frequency corresponding to channel 6 of the IEEE 802.11b technology. Finally, the signal is amplified using a radio-frequency amplifier with configurable gain (controlled by the FPGA, whose value is determined by the communication controller CC (5)), for example, one that results in a transmission power of 20 dBm EIRP. The parameters used in the generation of the noise sequence (duration, bandwidth, central frequency and power) are configured by the communication controller CC (5).

The noise generation in the interference band (23) can be conducted in a similar fashion, but employing a single DSSS noise signal with the corresponding circuit downstream. This design constitutes the preferential mode of implementation of the programmable noise synthesiser PNS (3) since it enables the synthesis of noise signals with configurable transmission duration, bandwidth, central frequency and power.

Conventional stations CS (2) integrate a commercial radio-frequency transceiver CT (4) and a communication controller CC (5). The commercial transceiver CT (4) is responsible for issuing the data transmissions requested by the CC (5). As mentioned, these transmissions can be performed using several contention methods. The application controlling the RTS1 (1) behaviour runs in the CC1 (5) and requests that a real-time data packet transmission (31) is preceded by a noise sequence (30) that clears the medium. Conventional stations CS2 and CS3 share the CS1 architecture, but may operate in any of the defined contention modes.

FIG. 3 represents a set of signals associated to the communication scenario (10) where the prioritization of the RTS1 (1) station in accessing the medium (11) can be observed, even when transmissions from an alien station AS1 or a conventional station CS3 are ongoing. The Alien station AS1 becomes ready to transmit at instant $t_{30}$. However, it must observe the state of the medium during a period equal to DIFS (acronym) before establishing its inactivity at instant $t_{31}$ and begin the transmission of an alien packet (31), whose duration extends until instant $t_{33}$. The Real-time station RTS1 is ready to transmit at instant $t_{32}$, initiating immediately, through the noise synthesiser PNS1, a noise sequence (30) transmission that is concluded at instant $t_{35}$. This transmission has a spectral content (23) that directly interferes with the alien packet (33), corrupting it, between the instants $t_{32}$ and $t_{33}$.

At instant $t_{36}$, immediately after the end of the noise sequence (30), the transmission of a real-time packet (31), occupying the data band (21), and the transmission of a sequence of protection noise (32) in the two sub-bands (20) and (22) begin simultaneously, and extended until instant $t_{37}$.

The requirement of transmitting immediately the real-time packet (31) aims at guaranteeing that the time window (from $t_{35}$ to $t_{36}$) elapsing between the end of the noise sequence and the beginning of the data transmission is smaller than the duration of the shortest Clear Channel Assessment (CCA) of any potential alien technology. This requirement allows prioritizing the data transmission (31) over the transmissions from alien stations that dispute the access to the shared medium, once within CCA period, the alien station will detect the transmission from real-time packet and will postpone the intended transmission for a future timing.

The noise sequence (30) guarantees the availability of the medium at instant $t_{35}$, allowing to initiate the transmission of the real-time packet (31) without the risk of collision with an ongoing alien packet. The transmission of a protection noise sequence (32), as presented, seeks to guarantee that the alien technology does not assess the medium as available when the real-time technology performs short range and narrowband transmissions.

The alien station AS1, after missing the transmission that it tried to initiate at instant $t_{31}$, observes the medium at instant $t_{34}$, but will only finds it available at instant $t_{38}$, initiating then the transmission that extends until instant $t_{39}$.

A similar cycle begins at instant $t_{40}$, corresponding to the dispatch of a real-time packet (31) transmission. This process continues regardless of the medium being occupied by a contention data transmission (34) initiated by station CS3. In this scenario, the transmissions of the noise sequence (30) and of the real-time packet (31) are conducted between instants $t_{42}$ and $t_{45}$, and $t_{46}$ and $t_{47}$, respectively, the later accompanied by a protection noise sequence (32) in both low (20) and high (22) sub-bands. As illustrated, the ongoing data transmission (34) is corrupted by the interference produced by the noise sequence (30) between the instants $t_{42}$ and $t_{43}$. Consequently, station CS3 assesses the medium at instant $t_{44}$, aiming to retransmit the previously corrupted packet and finds the medium busy. After a random amount of time, station CS3 assesses the medium for a second time at instant $t_{48}$ and, observing its availability, begins the retransmission of the data packet, which extends until instant $t_{49}$.

From the above discussion it follows that the suggested technique is adequate to guarantee real-time data packet transmissions (31) in predefined instants, since the noise sequence (30), preceding the real-time data packet, has a fixed duration, which allows to anticipate its beginning so that the medium is available at the instant where the data packet is to be transmitted.

The examples presented so far allow establishing real-time communications with controlled delay (and jitter) between a real-time station and one or more conventional stations. However, in comprehensive application scenarios requiring the support of multiple real-time data streams, it is possible to employ the principle explained above and extend it to cope with such feature. In this sense, a protocol building on the medium capture and maintenance defined in the invention and allowing real-time communications between several stations is presented below. The proposed protocol employs a master/multislave communication model in which the master station synchronizes the transmissions from slave stations trough a trigger message defining which stations (and when) are allowed to transmit in a specified time interval named elementary cycle.

Figure 4:
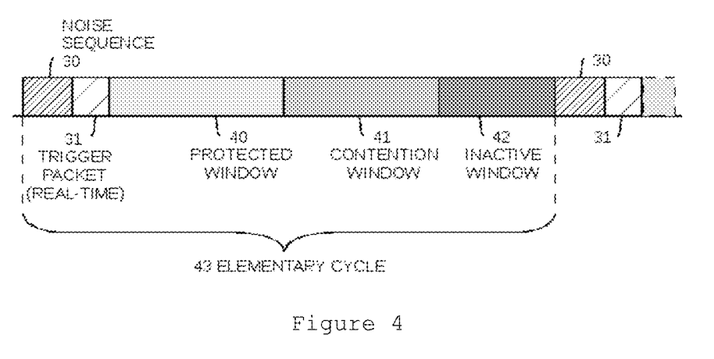
FIG. 4: Schematic representation of a temporal sequence corresponding to an elementary cycle, wherein:
(40) represents a protected window,
(41) represents contention window,
(42) represents an inactive window, and
(43) represents the elementary cycle.

FIG. 4 presents the protocol's temporal sequence of communication phases, which exemplifies the use of the invention to support real-time communications. This protocol encompasses the transmission of a periodic trigger packet (40) defining the window bounds of the current elementary cycle (44). The trigger packet is a real-time message (31) and, as such, it is preceded by a noise sequence (30) to guarantee the medium (11) availability at the end of its transmission (31). This trigger packet initiates an elementary cycle (43) composed of 3 time windows with specific access characteristics: protected window (40), contention window (41) and inactive window (42).

The protected window (40) envisages the transmission of the real-time packets explicitly defined in the preceding trigger packet (31). These transmissions are made so as to maintain the medium occupied and prevent neighbour alien technologies from having the chance of capturing the medium (11). Additionally, data transmissions are backed by noise transmissions in the low (20) and high (22) sub-bands. This approach aims to protect the transmissions conducted in this window against interference and denial of service attacks from contention-based technologies.

The contention window (41) establishes a period of time during which conventional stations compete for the medium (11) using standard contention-based mechanisms (for example, CSMA/CA). In order to guarantee that contention only occurs between conventional stations, the medium is occupied by noise transmissions in the low (20) and high (22) sub-bands in this window. This procedure is not necessary in scenarios where the alien technology(ies) operates with a bandwidth(s) narrower than the (conventional) data technology.

The inactive window (42) completes the elementary cycle (43), establishing a period of time in which stations with demanding autonomy requirements can switch to a mode of reduced power consumption by turning off their radio-frequency transceivers until an instant before the next trigger packet (31).

Figure 5:
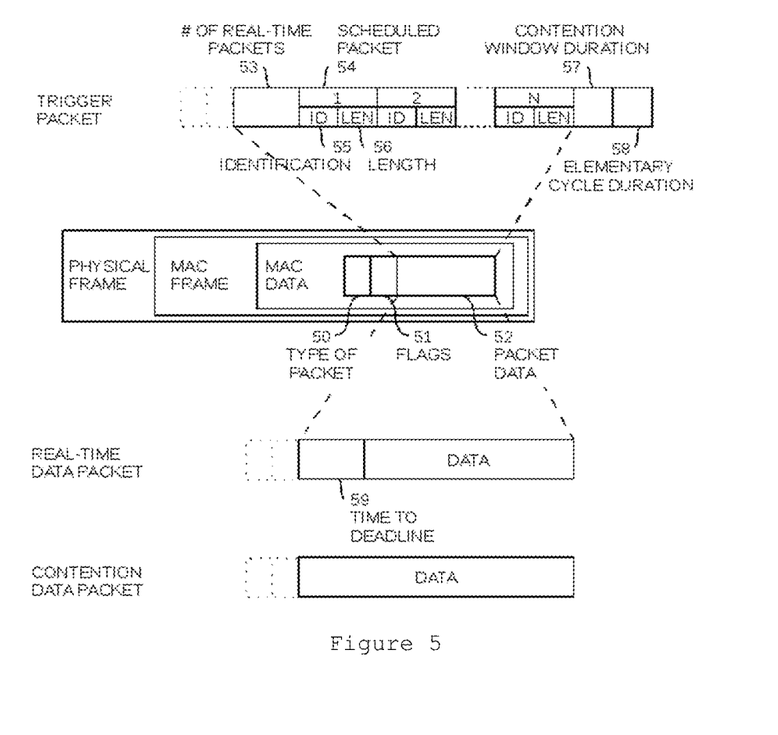
FIG. 5: Schematic representation of the format of packets used in master or slave station transmissions, where
(50) represents the field type of packet,
(51) represents the field flags,
(52) represents the payload,
(53) represents the number of real-time packets scheduled for the next elementary cycle,
(54) represents the information of a scheduled packet,
(55) represents the identification of a scheduled packet,
(56) represents the duration of a scheduled packet,
(57) represents the field duration of the contention window,
(58) represents the field duration of the elementary cycle, and
(59) represents the field time for the deadline.

The structure of the devised packets for this protocol is presented in FIG. 5. The trigger, real-time and contention packets are built using standard communication MAC packets and encapsulating the specific information in the payload of a data frame. The fields type of packet (50) and flags (51), which includes the sequence number, are common to all packet types. Each packet has a distinct data field (52) that depends on its type. The trigger packet (31) specifies the number of real-time packets that follow (53), the specific information for each one of them (54) (identity (55) and duration (56)), the contention window duration (57) and the duration of the elementary cycle (58). Given that the trigger packet (31) specifies the duration of all the transmissions in the protected window (40), the duration of the contention window (41) and of the elementary cycle (43), slave stations can calculate the total duration of the protected window (40) and determine the time bounds where they must be active (protected and contention windows) or switch off their communication transceivers (inactive window).

Although real-time (31) and contention (34) data packets have a similar structure, real-time time packets have an additional field specifying the time for the deadline (59), which is used to determine the "age" of the data.

Figure 6:
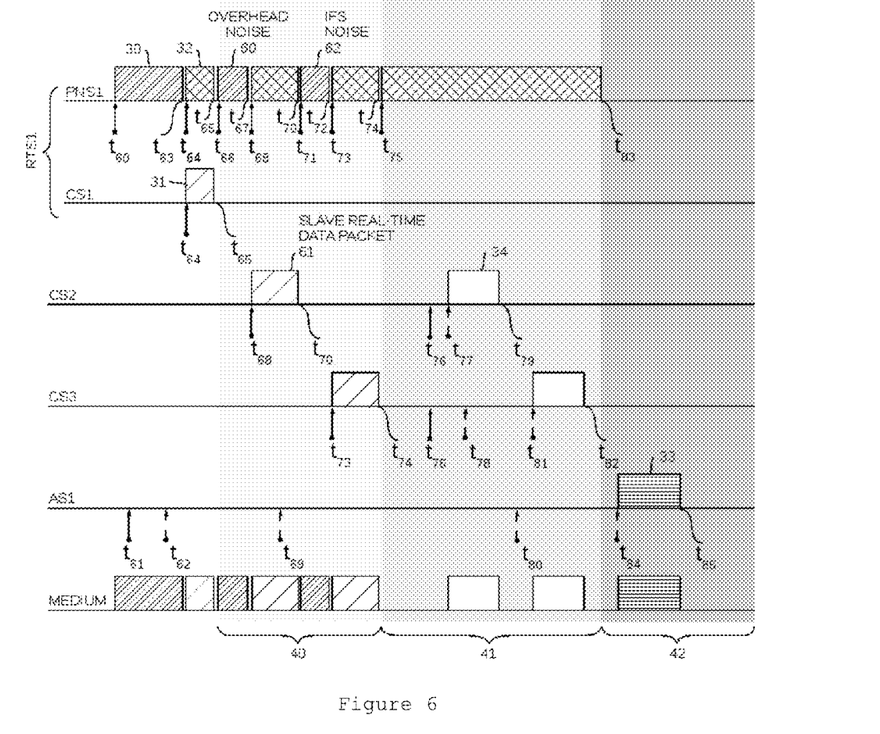

FIG. 6 depicts the signals associated with the communication scenario (10) where an elementary cycle (43) composed by protected (40), contention (41) and inactive (42) windows can be observed. The timeline associated with the medium activity only represents the transmissions occurring in the data communication channel employed by the conventional stations CS1, CS2 and CS3.

At instant $t_{60}$ (previously scheduled), station RTS1 (master) initiates a medium (11) capture by transmitting a noise sequence (30). The justification to transmit a noise sequence, even when the medium (11) "appears" to be idle, is the potential existence of alien stations (not represented) with ongoing transmissions that are not detected by the master station RTS1, but that interfere with slave stations that are at their reach. Accordingly, given that the noise sequence (31) is (should be) performed with the highest signal power legally permitted, the probability of interrupting ongoing alien transmissions is increased, releasing the medium for the successful transmission of the subsequent trigger packet (31).

At instant $t_{60}$ (previously scheduled), station RTS1 (master) initiates a medium (11) capture by transmitting a noise sequence (30). The justification to transmit a noise sequence, even when the medium (11) "appears" to be idle, is the potential existence of alien stations (not represented) with ongoing transmissions that are not detected by the master station RTS1, but that interfere with slave stations that are at their reach. Accordingly, given that the noise sequence (31) is (should be) performed with the highest signal power legally permitted, the probability of interrupting ongoing alien transmissions is increased, releasing the medium for the successful transmission of the subsequent trigger packet (31).

Next, at instant $t_{68}$, the transmission of a real-time packet (61) is initiated by the slave station CS2, without contention, so as to prevent any station from capturing the medium. Simultaneously, a protective noise transmission (32) is conducted in the low (20) and high (22) interference sub-bands.

In order to ensure that slaves station are able to successfully receive real-time transmissions from other slave stations, it is necessary to establish an interval between real-time packet transmissions in the medium (11) equal to the Inter Frame Space (IFS) of the data technology being employed. Notwithstanding, in order to maintain the channel capture, the master station RTS1 transmits a noise sequence (62) in the interference band (23) that occupies the time interval of the IFS (between the instants $t_{71}$ e $t_{72}$). The subsequent real-time data transmission (61) from station CS3 begins immediately after the end of IFS, from instant $t_{73}$ until instant $t_{74}$.

The contention window (41) begins at instant $t_{75}$ and ends at instant $t_{83}$. In this period, the master station RTS1, through the noise synthesiser PNS1, occupies the medium (11) in the low (20) and high (22) interference sub-bands so as to protect contention-based transmissions of conventional stations against interference from alien technologies. At instant $t_{76}$ both stations CS2 and CS3 are ready for transmitting contention packets (34) and simultaneously begin a random backoff process. However, given that station CS2 has a configured maximum number of backoffs smaller than the CS3 station, it will wait, in average, less time to perform the CCA than CS3 station, gaining priority for the transmission of its packet at instant $t_{77}$. Given that station CS3 only assesses the medium (11) at instant $t_{78}$ and since it finds it occupied by the CS2 transmission, a new CCA is postponed (random backoff process) to a future instant ($t_{81}$). At that instant, the medium (11) is found idle, and the corresponding transmission is started, extending until instant $t_{82}$. The use of different values for the maximum number of backoff slots allows establishing multiple levels of quality of service for contention-based data communications (sessions).

The inactive window (42) follows and extends until the next noise sequence (30) that precedes the transmission of a trigger packet (31). During this period, no transmissions are carried out.

At instant $t_{61}$, alien station AS1 becomes ready to transmit a packet. However, after observing the medium (11) for a DIFS period, it finds it occupied (due to the ongoing noise sequence transmission (30)), and postpones its transmission to a future instant. At instants $t_{62}$, $t_{69}$ and $t_{80}$ (random instants with increasing backoff limits) that precede instant $t_{84}$ at which time the medium is found idle and the alien transmission (33) is initiated, station AS1 successively assesses the medium as busy due to the noise sequence (30) ($t_{62}$), transmission of a real-time packet (61) seconded by a noise in the low (20) and high (22) sub-bands ($t_{69}$) or simply due to the noise in these sub-bands ($t_{80}$).

The temporal isolation of the protected window with regards to contention window is guaranteed by the protocol itself since contention packets will never be able to assess the medium as idle in the protected window due to the scheduled real-time transmissions (61) or the noise sequences (60) and (62). Traffic transmitted in the protected window must be explicitly authorized by the master station in the trigger packet (31) and will never be carried out beyond the specified temporal limits.

Regarding the isolation between the contention and inactive windows, slave stations must respect the temporal bounds identified in the trigger packet.

The described protocol enables the support of real-time communications in a medium affected by interference from contention-based communication (alien) technologies and establishes a prioritization mechanism capable of providing multiple levels of quality of service to contention-based data transmissions. Additionally, this protocol is able to support applications with demanding autonomy requirements, by employing elementary cycles with long inactive windows.

The proposed invention presents several innovations with regards to the techniques presented in the patents aforementioned, namely:

Noise transmissions from real-time stations can begin at any instant and not only when the medium is idle for a certain period of time (DIFS);

It addresses the existence of alien technologies that compete for the same medium of communication. If real-time communications occupy a bandwidth narrower than the bandwidth of the candidate alien technology to generate interference, these transmissions will be seconded by noise occupying the remaining band and simulating the occupation of the channel by an alien station. When this does not happen, only the real-time data will be transmitted;

The duration of the noise sequence is a function of the duration of the largest packet that can be transmitted by any alien technology in the neighbourhood, and not a function of the time that the station has waited to access the medium;

The fixed duration noise sequence has the goal of bringing into backoff state all neighbour stations (alien or conventional) so that the subsequent (and immediate) data transmission will not be affected by them. The approach presented in the aforementioned patents does not use noise sequences to capture the medium, inasmuch as uses it to arbitrate the medium access between real-time stations and to promote their prioritization over conventional stations;

The noise sequence is produced according to the channel where the data transmission is performed and to a spectrum mask corresponding to the technology with the largest interference capacity in the same channel;

The proposed technique can be applied in the implementation of protocols based in the master/multislave communication model, in which:

Only the master node transmits noise sequences employing specific hardware;

Slave nodes can be implemented with (standard) low cost transceivers simply requiring to be kept active to receive the trigger packet and during the protected and contention windows. They can, therefore, turn off the transceivers during the remaining period so as to maximize their autonomy;

Although a standard communication transceiver may assess the medium as idle, the transmission of the trigger packet is always preceded of a noise sequence. This procedure aims to interrupt potential transmissions of alien stations that may not be in the area of influence of the standard communication technology used by the master station for data transmission, but only at the reach of the technology used in the noise sequence transmission;

The network resynchronization is performed at each elementary cycle, which allows reducing the impact of clock drifts in the quality of the synchronization, reducing the guard times in which the medium is available and enabling the implementation of stations using controllers with low processing resources.

The invention claimed is:

1. Capture method of a shared communication medium comprising:
    transmitting a noise sequence followed, in a period of time less than a period of time of an idle channel assessment, by a data packet transmission by a real-time station;
    transmitting secondary and simultaneous noise in adjacent bands, low and high interference sub-bands, whenever alien communication technologies are operating on a data band, but employ larger bandwidths;
    wherein a data transmission is initiated after said noise sequence, by a transceiver, within a time window whose duration is less than a duration of a minimum Clear Channel Assessment (CCA) time of any alien communication technology to be inhibited.

2. The method according to claim 1, wherein said noise sequence is produced by a programmable noise synthesizer.

3. The method according to claim 1, wherein transmission power is equal or higher than that of the alien communication technology that is to be inhibited.

4. The method according to claim 1, comprising a duration more than the duration of a largest packet of any alien communication technology intended to be inhibited, or guaranteeing that said noise sequence always ends at a subsequent instant of any communication that has preceded said noise sequence.

5. The method according to claim 1, wherein a transmission is applied in a frequency band that includes the data band and which results in an occupied medium assessment by all alien communication technologies that are to be inhibited.

6. A method of transmitting real-time data, comprising capturing the shared communication medium, by a master station, according to claim 1, by the transmitting of a noise sequence in an interference band, followed by a trigger packet in a data band, and subsequent real-time data packet transmission by slave stations in the data band within an interference protected window.

7. The method according to claim 6, wherein the temporal limits of the current elementary cycle and the scheduling of the transmissions in the protected window are defined immediately after the noise sequence.

8. The method according to claim 6, wherein the transmission of real-time data packets takes place by slave stations in the instants defined by the trigger message, that occupy disjoint portions of time in the protected window, being separated by a minimum delay equal or more than a duration of an Inter Frame Space (IFS) of employed data communication technology.

9. The method for maintaining the capture of the communication medium within the protected temporal window between the trigger packet and the first data transmission of a slave station and between data transmissions from stations, according to claim 1, wherein an injection of a noise sequence occurs in the interference band, which prevents alien stations from detecting the medium as idle and from initiating a transmission corrupting the protected window.

10. Capture method of a shared communication medium comprising:
    transmitting a noise sequence followed, in a period of time less than a period of time of an idle channel assessment, by a data packet transmission by a real-time station;
    transmitting secondary and simultaneous noise in adjacent bands, low and high interference sub-bands.

11. A method of protecting data communications of a shared communication medium in a contention window, the method comprising:
    transmitting
    a secondary noise sequence, in adjacent bands, low and high interference sub-bands, preventing alien stations from detecting the medium as idle and from initiating a transmission corrupting the contention window.

* * * * *